UNITED STATES PATENT OFFICE.

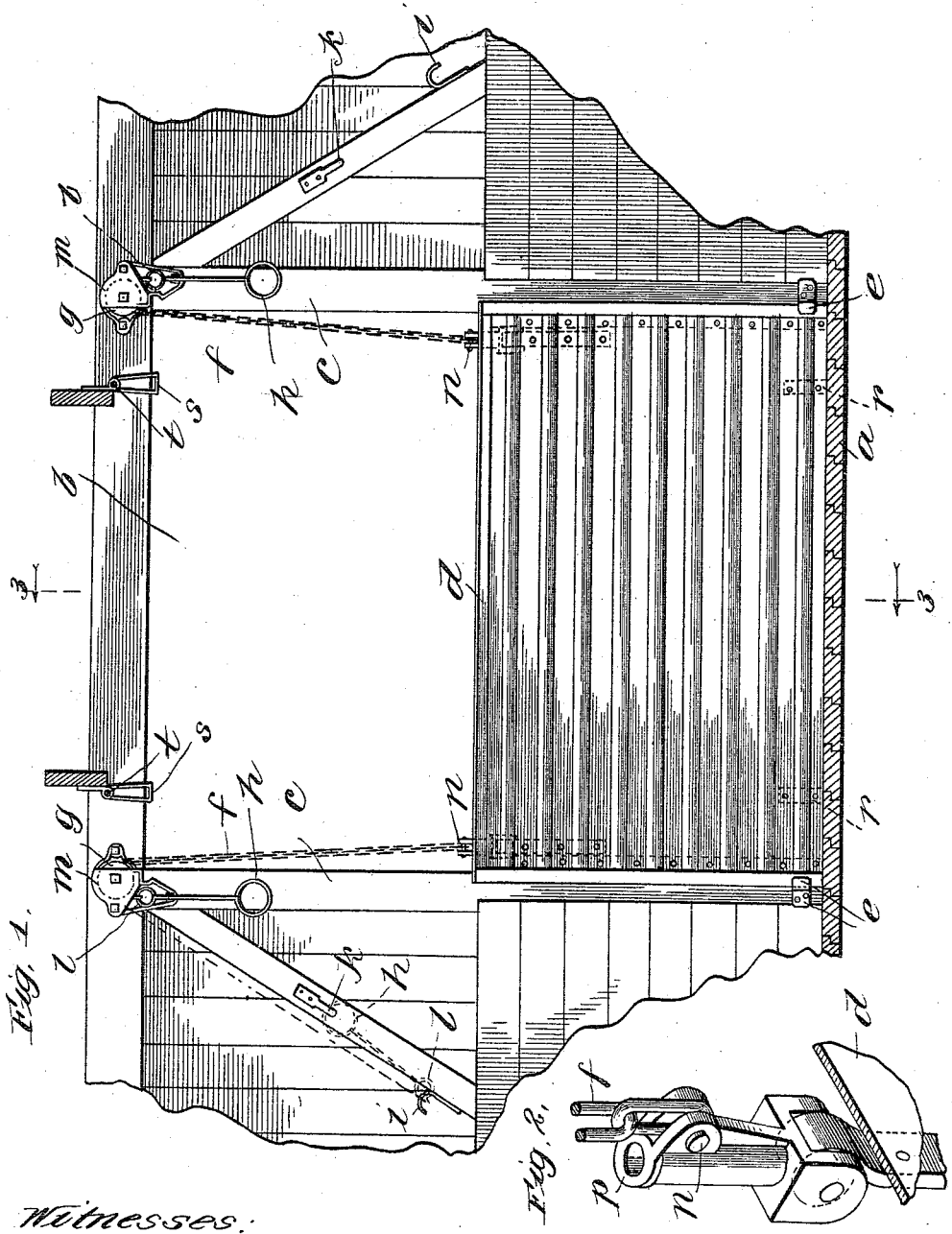

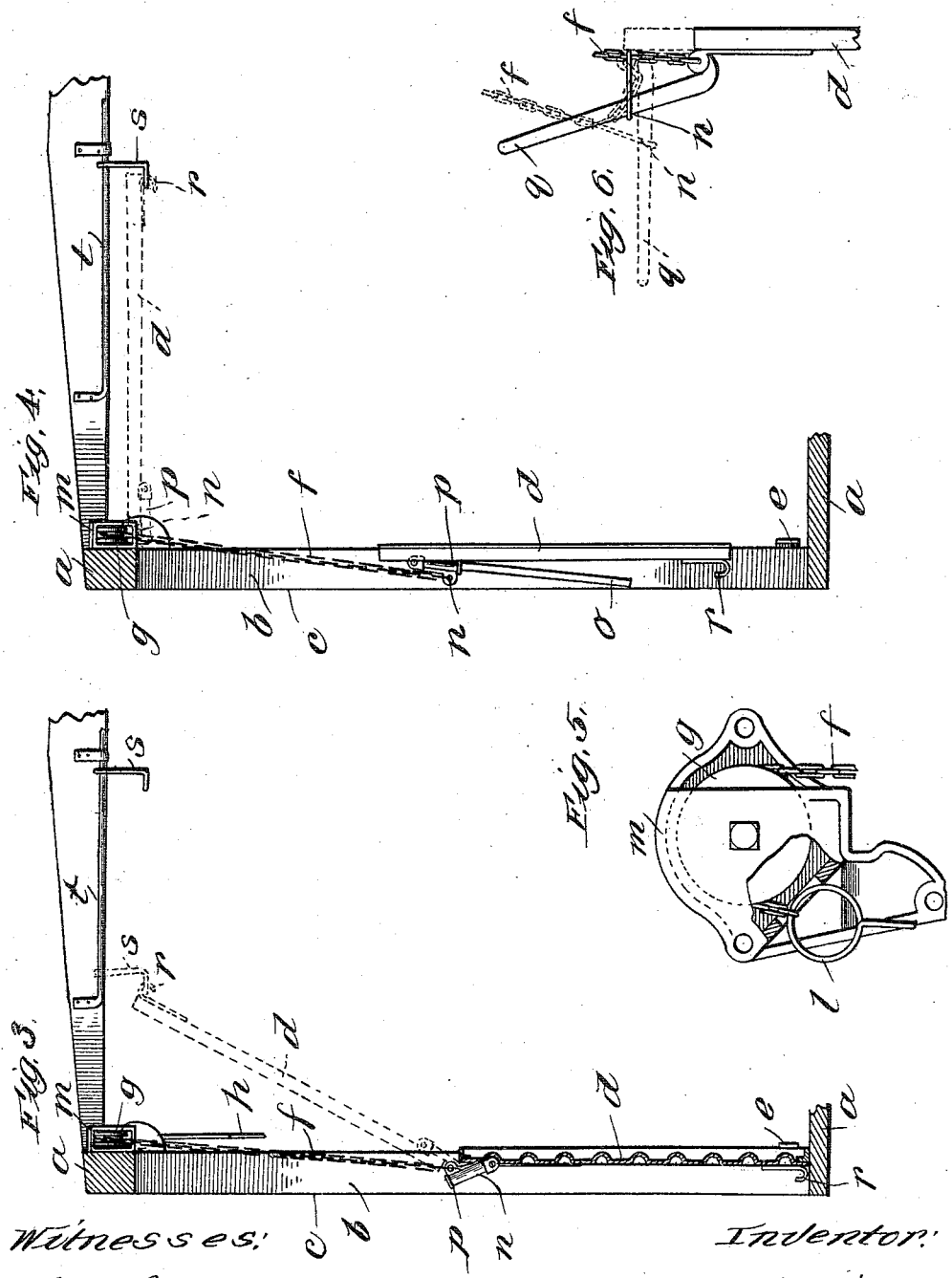

HERMAN C. PRIEBE, OF BLUE ISLAND, ILLINOIS.

GRAIN-CAR DOOR.

985,704.　　　　　Specification of Letters Patent.　　Patented Feb. 28, 1911.

Application filed October 17, 1910.　Serial No. 587,433.

*To all whom it may concern:*

Be it known that I, HERMAN C. PRIEBE, citizen of the United States, residing at Blue Island, in the county of Cook and State of Illinois, have invented a certain new and useful Improvement in Grain-Car Doors, of which the following is a full, clear, concise, and exact description, reference being had to the accompanying drawings, forming a part of this specification.

My invention relates to freight cars and in one of its features includes a door therefor mounted to be moved up and down and to be swung in a plane substantially perpendicular to the plane of the door opening, the mounting for the door permitting the lower portion of the door to be swung inwardly and upwardly, and means for holding the door in position when its bottom portion has been moved inwardly and upwardly, said means permitting travel of the door, when thus supported, transversely of the car toward the side opposite the door opening whereby the portion of the door normally constituting the top thereof may be raised further to remove the door from the door opening. By this feature of my invention the door may be readily manipulated in order to permit of the full discharge of the car contents very expeditiously, while also guarding the door against breakage in the event of its becoming partially dismounted.

Another feature of my invention may be described as consisting of a car structure including a car body having a door opening in its side, a door therefor mounted to be moved up and down, a flexible connection interposed between the upper portion of the car structure and the door and changeable in effective length between said upper portion of the car structure and the door, whereby the door may be raised, lowered, and held when raised, and mechanism, preferably lever mechanism, permitting up and down movement of the point of attachment of the door with said flexible connection whereby an initial upward movement may very readily be imparted to the door without changing the effective length of the flexible connection between the upper portion of the car structure and the point where said flexible connection supports the door.

I will explain my invention more fully by reference to the accompanying drawings showing preferred structural characteristics and in which—

Figure 1 is a view of a portion of a side of a car looking from the interior of the car and constructed in accordance with the invention. Fig. 2 is a view in perspective, illustrating the mechanism whereby the place where the flexible connection is in supporting relation with the car door may be lowered in order that the door may be initially elevated to permit of a partial discharge of the car contents, and thereby to relieve the pressure of the car contents upon the door so that the door may thereafter be further elevated. Fig. 3 is a transverse sectional view on line 3—3 of Fig. 1, an alternative position of the door being shown in dotted lines. Fig. 4 is a view similar to Fig. 3, excepting that the door is shown in full end elevation and in the position it occupies when initially opened, the door being shown entirely clear of the door opening by the dotted lines. Fig. 5 is a detail view in elevation partially in section of the mechanism employed for holding the flexible door supporting connection stationary with respect to the upper portion of the car structure so that the door may be given its initial opening movement, the structure illustrated in this figure permitting change in the effective length of the flexible connection merely by pulling thereupon. Fig. 6 is a view of a substitute for the construction shown in Fig. 2.

Like parts are indicated by similar characters of reference throughout the different figures.

The car structure shown includes a car body *a* which may be made according to any preferred design such as the common box or house car. The trucks that support the car body are not shown. The car body has a door opening *b* in its side, this door opening being margined by door posts *c*. A door *d* is adapted to be lowered so that its bottom will rest upon the floor of the car body, this door being held in close engagement with the door posts by means of clips *e*, these clips being cleared when the door has received its initial opening movement so that the bottom of the door may be swung inwardly and upwardly in the process of bringing the door to the position shown by the dotted lines in Fig. 4 when the car contents have been sufficiently discharged through the opening occurring beneath the door when the door has been initially raised. The flexible connections $f$, which are shown in the form of chains, to which I do not wish to be limited, may be suitably operated upon in order further to raise the door from the floor of the car. In the form of the invention shown the chains $f$ are passed over sheaves $g$ and terminate at their free ends in eyes $h$ that may be grasped by the operator preferably when the door is to be raised from its initial open position. When the door is to be held in the position to which it may fully be raised by means of the chains $f$, said chains are desirably passed over hooks $i$ and the eyes $h$ are retained by hooks $k$. A portion of each chain desirably includes an element $l$ that engages the sheave housing $m$ when the door is in its lowermost position, thereby affording rigid connections between the chains and the car roof so that when the points of attachment $n$ (both Figs. 2 and 6) are lowered upon depression of the lever bars $o$ inserted in the sockets $p$ of the structure as shown in Figs. 1, 2, 3 and 4, which are pivotally connected with the door, or by depression of the levers $q$ of the structure shown in Fig. 6, the door will be raised to its initial open position. It will be observed that the initial opening of the door is caused by occasioning the upward movement of the point of attachment of the door with said flexible connection where and when said flexible connection is held stationary at the upper portion of the car, this point of attachment being thereafter lowered to occupy its normal position with respect to the flexible connection when the door is to be closed. After the car contents have been sufficiently discharged through the initial door opening, the bottom of the door may be swung inwardly and upwardly to enable the hooks $r$ to be engaged with the loops $s$ (see Fig. 3) to hold the door in an inclined position initially whereafter the chains $f$ may be drawn upon until the eyes $h$ may be engaged with the hooks $k$ so that the top portion of the door may be raised. As the top portion of the door is raised the bottom portion of the door pushes upon the loops $s$ and causes these loops to slide transversely of the car upon supporting rods $t$. By this construction the top of the door may be maintained in close proximity to the side of the car while the bottom of the door may be maintained at a point near the middle of the car, the entire arrangement illustrated permitting ready removal or clearance of the door from the door opening and guarding the door against breakage in the event of its becoming unfastened from some of its supporting attachments. Each or both of the rods constitutes a runway extending transversely of the car near the top thereof, the loops and hooks engaging same coöperating with the runway to hold the bottom of the door in different positions according to the extent to which the top of the door is elevated. It will be seen that when the top of the door is raised while the bottom of the door is held elevated that the fastening connection that supports the bottom of the door becomes a positive lock so that the bottom of the door cannot be unhooked until the top of the door has been lowered to permit the door to occupy that inclined position to which it was brought to enable the bottom of the door to be held in a raised position. I do not wish to be limited to this runway structure, however.

Reference may be had to my co-pending application, Serial No. 560,552, filed May 11, 1910.

While I have herein shown and particularly described preferred embodiments of my invention, I do not wish to be limited to the precise details of construction shown, as changes may be readily made without departing from the spirit of my invention.

Having thus described my invention I claim as new and desire to secure by Letters Patent the following:

1. A car structure including a car body having a door opening in its side; a door therefor mounted to be moved bodily upwardly while remaining at the door opening and to be swung so as to have its bottom moved inwardly and upwardly in a plane substantially perpendicular to the plane of the door opening; and means for holding the door in an initially inclined position when the bottom portion has been moved inwardly and upwardly, said means permitting travel of the bottom of the door, when thus supported, transversely of the car toward the side opposite the door opening whereby the portion of the door normally constituting the top thereof may be raised further to clear the door from the door opening.

2. A car structure including a car body having a door opening in its side; a door therefor mounted to be moved bodily upwardly while remaining at the door opening and to be swung so as to have its bottom moved inwardly and upwardly in a plane substantially perpendicular to the plane of the door opening; and means for holding the door in an initially inclined position when the bottom portion has been moved inwardly and upwardly, said means permitting travel of the bottom of the door, when thus supported, transversely of the car toward the side opposite the door opening whereby the portion of the door normally constituting the top thereof may be raised further to clear the door from the door opening, said means including a supporting runway extending transversely of the car near the top thereof, and an element coöperating with and movable along the runway to support the lower portion of the door in different positions.

3. A car structure including a car body having a door opening in its side; a door therefor mounted to be moved up and down; a flexible connection interposed between the upper portion of the car structure and the door and changeable in effective length between said upper portion of the car structure and the door, whereby the door may be raised, lowered, and held when raised, and mechanism permitting up and down movement of the point of attachment of the door with said flexible connection with respect to said flexible connection where and when held stationary at the upper portion of the car whereby an initial upward movement may be imparted to the door.

4. A car structure including a car body having a door opening in its side; a door therefor mounted to be moved up and down; a flexible connection interposed between the upper portion of the car structure and the door and changeable in effective length between said upper portion of the car structure and the door, whereby the door may be raised, lowered, and held while raised, and lever mechanism coöperating with said flexible connection to occasion lowering of the point of attachment of the door with said flexible connection with respect to said flexible connection where and when held stationary at the upper portion of the car whereby an initial upward movement may be imparted to the door.

In witness whereof, I hereunto subscribe my name this 13th day of October A. D. 1910.

HERMAN C. PRIEBE.

Witnesses:
G. L. CROGG,
WM. J. HERDMAN.

Copies of this patent may be obtained for five cents each, by addressing the "Commissioner of Patents, Washington, D. C."